US009615551B2

(12) United States Patent
Ulyanov

(10) Patent No.: US 9,615,551 B2
(45) Date of Patent: Apr. 11, 2017

(54) VIBRATING LURE (VARIANTS)

(76) Inventor: Sergiy Vladlenovych Ulyanov, Dniepropetrovsk (UA)

( * ) Notice: Subject to any disclaimer, the term of this patent is extended or adjusted under 35 U.S.C. 154(b) by 217 days.

(21) Appl. No.: 14/240,392

(22) PCT Filed: Mar. 19, 2012

(86) PCT No.: PCT/UA2012/000029
§ 371 (c)(1),
(2), (4) Date: Feb. 23, 2014

(87) PCT Pub. No.: WO2013/043144
PCT Pub. Date: Mar. 28, 2013

(65) Prior Publication Data
US 2014/0190065 A1 Jul. 10, 2014

(30) Foreign Application Priority Data
Sep. 20, 2011 (UA) .................. 2011 11199

(51) Int. Cl.
*A01K 85/00* (2006.01)
*A01K 85/16* (2006.01)
*A01K 85/12* (2006.01)
*A01K 85/14* (2006.01)

(52) U.S. Cl.
CPC .............. *A01K 85/12* (2013.01); *A01K 85/00* (2013.01); *A01K 85/14* (2013.01); *A01K 85/16* (2013.01)

(58) Field of Classification Search
CPC .................................. A01K 85/00; A01K 85/16
USPC ............ 43/42.22, 42.23, 42.39, 42.45, 42.49
See application file for complete search history.

(56) References Cited

U.S. PATENT DOCUMENTS

| 2,563,282 | A | * | 8/1951 | Schenck | A01K 85/16 43/42.22 |
| 2,715,790 | A | * | 8/1955 | Carpenter | A01K 85/16 43/42.09 |
| 2,736,124 | A | * | 2/1956 | Wittmann | A01K 85/16 43/42.06 |
| 2,753,649 | A | * | 7/1956 | Sporket | A01K 85/16 43/42.22 |
| 3,243,912 | A | * | 4/1966 | Newman | A01K 85/16 43/42.16 |

(Continued)

*Primary Examiner* — David Parsley
(74) *Attorney, Agent, or Firm* — Defillo & Associates, Inc; Evelyn A Defillo

(57) ABSTRACT

A vibrating lure for amateur fishing predatory fish, including an elongated holder with a hole (holes) for attaching a fishing line, a load at its front portion, a hook at its rear portion, and a plate movably attached longitudinally to the holder. The holder is in the form of a curved metal rod, having front and rear portions bent downwardly and threaded with a gap into two holes in the plate, formed in a front portion and in a rear portion on a longitudinal axis of the plate, and ends of curved portions of the holder are diverged apart. An alternate narrow holder has projections at the front portion and at the rear portion, with ends diverged apart or brought together (consolidated). The plate is formed to rotate around its longitudinal axis in both directions and to approach the raised lateral portions of the plate at the same distance relative to the vertical plane passing through the axis of rotation of the plate and the longitudinal axis of the holder. The vibrating lure is used for different fishing techniques, in particular at great depths.

13 Claims, 3 Drawing Sheets

(56) References Cited

U.S. PATENT DOCUMENTS

| | | | | |
|---|---|---|---|---|
| 3,724,117 A * | 4/1973 | Flanagan, Jr. | ......... | A01K 85/14 43/42.24 |
| 3,981,096 A * | 9/1976 | Toivonen | ............... | A01K 85/14 43/42.39 |
| 4,471,556 A * | 9/1984 | Dworski | ................ | A01K 85/16 43/42.23 |
| 5,020,265 A * | 6/1991 | Nuckols | ................ | A01K 85/14 43/42 |
| 5,133,146 A * | 7/1992 | Stecher | ................ | A01K 85/16 43/42.47 |
| 8,020,339 B1 * | 9/2011 | Carter | ................... | A01K 85/00 24/594.1 |
| 8,769,862 B2 * | 7/2014 | Blanchar | ................ | A01K 85/00 43/42.09 |

\* cited by examiner

VIBRATING LURE (VARIANTS)

The invention relates to amateur fishing, in particular, to the artificial lure with a movable petal of type 'in-line spinners', and it can be used for amateur fishing of predatory fish by trolling, jigging, plumb baiting and uniform bottom leading at great depths, as well as it can be used during winter time in ice-free basins in open water for fishing at wells.

There are known the in-line spinners, which are based on the usage of a metal petal rotating around the wire axle (shaft) when led. Typically, the axle either passes directly through the hole in the petal or through the assembled unit of 'shackle-collar' whereon the petal hangs. The in-line spinners can be also divided into two groups, one of which has got a front load and the other—a rear load. In the in-line spinner with the front load, the weight is arranged before the in-line spinner. The in-line spinners with the front load can be thrown farther, as their weight and size practically make no influence on the size of a petal [Brothers Scherbakovs. Modern Spinning Technique.—M.—OOO Publishing house Astrel, 2006, p.65-73].

In transparent water the in-line spinners attract a predator attention by shimmering glitter of the petal being similar to a scale sparkle of a small playable fish.

The strongest oscillations are created by the in-line spinners having large and wide petals. However, these spinners have high drag when moving. In addition, these spinners can not be used in deep water: firstly, the spinner very much overloads the rod and the line, and secondly, it tends to surface even at a low rate of leading. When using the in-line spinner, there should be taken into account that in some circumstances, it may cause twisting of the fishing line on difficult conditions, the line should be thrown away after a few casts at fishing.

On performing the cast, the in-line spinner having a front load is often engulfed over hooks by the fishing line. At the moment of flying the bait, it is possible to reduce the danger of tie by performing the cast smoothly along a steep trajectory with avoiding low and strong throws. Not to be knotted with the hooks while diving, the line should be slightly restrained before the bait touches the water. [Modern spinning. Blisch V. N. Aquarium Moscow, 2003, p. 64-69].

In ensuring the effectiveness of the in-line spinners, the characters of the vibrations created by the above said in-line spinners are of great crucial importance. In some cases, the predator is attracted by the baits generating sharp fluctuations and vibrations, and the in-line spinners creating soft and uniform vibrations are not effective. The in-line spinners can only create the vibrations of one intensity and frequency. To change the type of vibrations, it is necessary to use another spoon.

The in-line spinner oscillations are radiated by the petal during its smooth uniform rotation, and therefore, the character of oscillations, which are soft and uniform vibrations occurring during the smooth rotation of the curved plate in a stream of water distinguishing the oscillations of the in-line spinners from the vibrations produced, for example, at swinging from side to side of the other types of baits.

Since one of the elements that attracts predators are noises generated by bait, some in-line spinners are additionally equipped with special noise chambers.

The in-line spinners, however, have the following disadvantages.

When using spinners, twisting of a fishing line while operating the spinners is based on the non-interrupting rotation around a thin axle. The continuous rotation of the petals results in gradual tightening of the thin axles whereon they are located, as the process of rotation of such an axle substantially meets no resistance in water flow. Because of the fact that at the present time, there are widely used the expensive braided cords as fishing lines (their cost is many times more then the cost of the spinners) having high strength, wear resistance and durability, the use of the in-line spinners results in rapid damage of the cords. To prevent this phenomenon at using the in-line spinners, there are additionally applied various devices to prevent a fishing line from spinning, but the problem is not solved in principle. In addition, such devices for preventing a fishing line from spinning can scare off the predators.

Some types of the in-line spinners are poorly thrown, because at casting the in-line spinners are often engulfed by the fishing line over a hook. Because of the fact that in the in-line spinner, there is used a large petal, comparable in size with the spinner itself, which petal being attached to the axle of the spinner at one point and having a high degree of freedom, the petal, except rotation, is also free to deviate from the axis of the spinner at any angle, and at casting spinner with a load arranged on the axle behind the plate, that plate sails creating significant resistance at flying, randomly move and tremble, preventing long distance casting spinners. For the same reason, the spinner flies unstably, it tumbles resulting in frequent engulfing of the fishing line over the hook of the in-line spinner.

Using the in-line spinners having a load arranged in the nose portion of the spinner, causes the plate to have already rotated in the air, creating an even greater resistance to the flight, which fact results in increasing the drag and shortening the flight range. In addition, engulfing of such spinners occurs more frequently as the load provides flying of the spinner with the axis position at horizontal plane, while the fishing line attached to the spinner in the nose portion, is adjacent to the axle and lies down on the hook arranged at the tail portion of the spinner right on its axle (axis). To eliminate this phenomenon of the spinner with a load arranged at front portion of the spinner, there is often used a regular hard wire fishing leash, which cannot completely eliminate the problem and which is an additional element alarming some types of predator.

The in-line spinners with a load arranged in the middle portion of the spinner operates stable only at achieving a certain speed. Since the in-line spinners are connected with a fishing line in the spinner nose portion, in the beginning of its movement the axle is arranged in a position close to the vertical one, wherein the plate is studded onto the axle, and its rotation gets impossible. When the required speed of the in-line spinner had achieved, the spinner axle (axis) occupies a position close to the horizontal one, and the plate starts rotating. Accordingly, to start and provide the stable operation of such kind of spinner, there is need in need in a special value of speed below which the plate stops spinning. Usually the predator prefers slow moving bait, and in some cases, it is required the use of a bait moving slower than the in-line spinners. In addition, while accelerating without any oscillations at the beginning of leading, the in-line spinner at frequent stopping and recommencing leading, runs inefficiently a part of its way under the water. The in-line spinners with a load in the middle portion of the spinner for the bottom leading at great depths are unsuitable because they immediately float up and stop operating after having interrupted movement and fall onto the bottom. The in-line spinners with the load arranged in the nose portion of the spinner are used for a bottom leading jig, that is a method wherein there is alternated short-term pulling on the fishing line and followed stopping, and in doing so the spinner rises from the bottom and again lowers down. Since, while rotating in water flow, the petal creates a high resistance to movement, it goes on rotating with changing its angle in the vertical plane for the directly opposite one, and the spinner has no other structural elements that could make it lower down, acting as an anti-wing, as a wobbler blade, and the uniform movement results in rapid floating up of the bait in the upper layers of water. Thus, the spinners might be problematic for the uniform bottom leading at considerable depths, which technique is necessary when fishing of certain species of predator. In such cases, there are often used the spinners of considerable load that roughens the fishing tackle, troubles fish and does not solve the problem. For the same reason the in-line spinners without additional external load cannot be used at great depths to fish by trolling, that is, with uniform dragging behind a moving boat.

While rotating in water, the petal flits attractively to the predators, but it does not cover over the front-arranged static load of the bait as well as the hook arranged in the tail portion of the bait, which often scare off the predators.

The technical solution being the closest one to the present invention is a universal mountable and demountable in-line spinner "Симма" comprising a shaft (axle) made of metal, thin and elastic wire and having a limb arranged at its end portion; a hook associated with the shaft; and also a petal (plate) and a removable load associated with the limb, which are arranged on the shaft, wherein the load has an opening of a slit shape being offset relative to the load axis of symmetry [RU No. 2064259 C1, A01K 85/00, 1996].

The petal is attached to the axle at one point, and this fact provides for its uniform rotation during the spinner movement. In doing so, the petal is independently departing from the axis of the spinner rotation for a certain angle that depends on the petal curve, speed of leading and other factors.

The design features of the spinner improve its usability by allowing the actual field replacement of its basic elements making the spinner mobile and raising its productivity. Thus, the spinner design does make it possible to replace a load allowing, to a certain extent, to change the depth of its normal leading process and also to replace the rotating petal (plate), as well as allowing, to a certain extent, to change the nature of the oscillations there created. Since the general defect of the in-line spinners is the fishing line twisting while using the spinner, there was applied the design of a load with an offset hole to be aimed at eliminating the fishing line twist.

At the same time, to use the spinner at different depths, it is necessary to have several loads of different weights, and changing the nature of oscillations requires a corresponding number of spare petals, which is inconvenient. To replace spare completing parts, it is required to have special time. Furthermore, using an oversized lead of a more considerable weight to increase the depth of leading makes a predator worrying.

Replacing a rotating petal allows, to a certain degree, forcing the oscillations created by the spinner, but it does not significantly alter the type and nature of the created oscillations.

Using a spinner having a massive load roughens the tackle, makes fish worrying and results in a reduction of bites. Moreover, when entering shallower places, the heavy spinner, being located parallel to the bottom, usually moves in close proximity to the bottom and touches the bottom not only with a load, but also with a petal, which in such a case stops operating.

In addition, this spinner has a hook, located directly on the axis of the spinner, increasing the fear of knotting of the fishing line over the hook at casting. When lowering the spinner in the vertical plane, the fishing line runs at close proximity to the hook, which fact increases the risk of knotting over the hook when using this fishing spinner in a plumb or driftage, as well as snagging of the fishing line for the rotating petal. When using spinners at fishing in plumb, while being pulled up, the spinner runs and creates oscillations, but the spinner rises and falls unnaturally, in the vertical plane, which fact also limits the possibility of using this method. These drawbacks limit the use of spinners for fishing in plumb.

The design features of the spinner allow using it at cast fishing, including the usage of the jig method at a considerable depth. But because of the large drag and lack of design planes acting as anti-wings, this spinner is problematic to use for trolling or uniform leading at great depths.

The in-line spinner oscillations are emitted by the petal during its smooth and uniform rotation.

Since the petal rotating in the water flow creates high resistance to the movement and constantly changes its angle for the opposite one in the vertical plane, and the spinner, except for a load, has no other structural elements that could make the spinner to deepen while acting as an anti-wing, as a blade of the wobbler, the uniform movement results in gradual surfacing of the spinner, especially when trolling at considerable speed.

The presence of only one tail hook increases the number of 'idle' bites under the condition when a fish grabs the spinner in the area of a load and plate (petal) and is not pinpointed over the hook.

Taking into account that a plate, which smoothly rotates in a flow of water and is faced with its convex side towards the oncoming flow of water, does not create any significant lateral forces deflecting the spinner axis aside, therefore, the spinner practically moves without any lateral deviations from side to side.

Thus, in the process of the spinner operation, its load, axle and hook are moving without oscillations thereby exposing themselves so unnatural and unattractive that sometimes they make a predator troubling.

The invention is aimed at solving the technical problem to change the design known from the art and create a vibrating lure for amateur fishing, which would have significant oscillations within the effective range of frequencies and amplitudes, the ability to perform self-deepening, high flight characteristics when casting, and also which would be universal for different ways of fishing, particularly, at great depths, and which would be resulted in increased performance while fishing predatory.

The problem is solved by creating a design of a vibrating lure comprising, as a lure known from the art, an elongated holder with at least one hole for fixing the fishing line, a load at its front portion, a hook at its rear portion, and a plate movably attached to the holder, wherein, according to the invention, the holder being corresponding to the length of the lure is performed as a convex curved metal axle (shaft), which front and rear portions are bent downwards in the vertical plane and are threaded with a gap into two holes of the longitudinally elongated plate, those holes being performed in the front and rear portions of the plate on its longitudinal axis that is also its axis of symmetry; the ends of the bent portions of the holder are diverged apart, wherein the load is attached at the front end of the bent portion of the holder, and at the rear portion, there is a loop for the hook; also the holes for attaching the fishing line are performed on top of the holder in the vertical plane, and they are arranged above the longitudinal axis of the plate over the area between the nose and middle portions of the plate; and wherein those holes are offset rearwards relative to the center of gravity of the lure; the plate being arranged with its longitudinal axis lengthwise to the holder is performed either flat, or its lateral portions are symmetrically convex curved upwards relative to the longitudinal axis of the plate, wherein the plate being performed with the possibility of rotation around its longitudinal axis in both directions and with the possibility for approach of the raised lateral portions of the plate, which is maximum turned to each side, at the same distance relative to the vertical plane passing through the axis of rotation of the plate and the longitudinal axis of the holder without reaching the mentioned vertical plane by the lateral portions.

The holes for fixing the fishing line may be performed with the help of a wire loop or in a metal eyelet attached to the holder, wherein one of the loops or the hole for the fishing line can be performed horizontally elongated or at an angle.

The vibrating lure can be additionally equipped with at least one more another hook movably or fixedly attached to the front portion of the lure, with a loop for attaching the front hook being performed at the front end of the bent portion of the holder before the load or on the load.

The elongated plate may be executed either with an extended front, middle or rear portion, or with the flat nose edge, or with a symmetrical cutout in the nose edge.

The curved plate may have a curve of cylindrical or conical configuration, in the form of facets or of combined form. The plate may have a flat or flattened front portion and a rear portion curved to a greater extent.

The holes of the plate may be performed in the tapered or longitudinal recesses which are additionally provided on the plate and protrude above the surface of its back side, or at least one of the holes of the plate may be symmetrically elongated transversely to the plate axis of symmetry.

The load can be fixedly or movable attached to the front portion of the holder, or it can be executed removable with the ability to be replaced with the load of other weight.

The loads may be arranged at the level of the plate or slightly above or below that level. It can be performed protruding ahead of the plate, or it at least partially can be situated in a recess of the nose portion of the plate with a gap providing the mobility of the plate, or the rear portion of the elongated load is positioned over the plate surface.

The loads can be made with a special sharpening or having roundness at its bottom and front portion, or it has at least one downwardly projecting elastic barb, or a hard barb directed forward or backward.

The hook of the lure can be fitted with a fur or synthetic brush or a silicone worm as the additional attractions for the predators.

The problem is also solved by creating a design of a vibrating lure comprising, as a lure known from the art, an elongated holder with at least one hole for fixing the fishing line, a load at its front portion, a hook at its rear portion, and a plate movably attached to the holder, wherein, according to the invention, the narrow elongated holder of the streamlined shape being corresponding to the length of the lure at least in the middle portion is performed volumetric and narrow in the cross section or flat in the vertical plane, and it has protrusions at the front and rear portions performed transverse to the longitudinal axis of the holder, and they are arranged in one vertical plane with the flat portion of the holder, wherein the ends of the protrusions are diverged apart, consolidated or longitudinally expanded, the portions of the protrusions, which are arranged transverse to the longitudinal axis of the holder, are threaded with a gap into two holes of the longitudinally elongated plate that are performed in its front and rear portions on the longitudinal axis of the plate being also the axis of its symmetry; the plate is arranged with its longitudinal axis lengthwise to the holder, the holes for attaching the fishing line are performed on the holder, and they are arranged above the longitudinal axis of the plate over the area between the nose and middle portions of the plate; and wherein those holes are offset rearwards relative to the center of gravity of the lure; the lateral portions of the plate are symmetrically convex curved upwards relative to the longitudinal axis of the plate, wherein the plate being performed with the possibility of rotation around its longitudinal axis in both directions and with the possibility of approach of the raised lateral portions of the plate, which is maximum turned to each side, at the same distance relative to the vertical plane passing through the axis of rotation of the plate and the longitudinal axis of the holder without reaching the mentioned vertical plane by the lateral portions.

The volumetric or flat portion of the holder may be made of metal or plastic, and the protrusions of the holder may be performed separately as a shaft of wire or in the form of flat projecting portions of the holder.

The front hole for attaching the fishing line may be performed elongated horizontally or obliquely (at an angle).

The vibrating lure can be additionally equipped with at least one more another hook movably or fixedly attached to the front portion of the lure, with the loops or holes for attaching the hooks being performed at the bent (turned) ends of the protrusions of the holder, or with the hole for the tail (rear) hook being performed at the flat and rear portion of the holder, or with the loop for the front hook being performed on the load at the front portion of the holder.

The plate may be executed either with an extended front, middle or rear portion, or with the flat nose edge, or with a symmetrical cutout in the nose edge.

The plate may have a curve of cylindrical or conical configuration, in the form of facets or of combined form. The plate may have a flat or flattened front portion and a rear portion curved to a greater extent.

The holes of the plate may be performed in the tapered or longitudinal recesses, which are additionally provided on the plate and protrude above the surface of its back side, or at least one of the holes of the plate may be symmetrically elongated transversely to the plate axis of symmetry.

The load can be movably or fixedly connected to the front, elongated and flat portion of the holder, or to the bent forward end of the front protrusion of the holder, or it can be performed removable with the possibility of being replaced by the load of other weight, or it may be performed inseparable from the holder or formed as an extended forward or outstretched portion of the holder being cast of metal.

The loads may be arranged at the level of the plate or slightly above or below that level. It can be performed protruding ahead of the plate, or it at least partially can be situated in a recess of the nose portion of the plate with a gap providing the mobility of the plate, or the rear portion of the elongated load can be positioned over the plate surface.

The loads can be made with special sharpening or having roundness at its bottom and front portion, or it has at least one downwardly projecting elastic barb, or a hard barb directed forward or backward.

The hook of the lure can be fitted with a fur or synthetic brush or a silicone worm as the additional attractions for the predators.

The claimed vibrating lure has the load located in the nose portion as well as the planes arranged likewise the feathers of an arrow while flying, and therefore, those ones perform the function of the stabilizer. At flying, the vibrating lure is oriented forward with the nose portion, while the plate being behind the load, which arrangement stabilizes the flight, lengthwise the longitudinal axis of the lure.

The plate of the vibrating lure does not change its angle of inclination relative to the longitudinal axis of the lure and, therefore, it does not interfere with the flight.

While being in operation, the vibrating lure does not rotate around the axis and is not able to twist the line.

The arrangement of the tail hook being shifted relative to the longitudinal axis, and also the lower and front hooks being arranged aside from fishing line, without additional structural elements, considerably reduces a probability of knotting fishing line over the hooks at casting the vibrating lure, which is not engulfed by the fishing line over the hook at vertical sinking to the bottom.

The vibrating lure has a plate that creates strong vibrations and has dimensions slightly less than the total length of the lure. The vibrating lure creates strong vibrating oscillations propagating over a long distance; one and the same lure offers a possibility for the choice of several options of the structurally inherent vibration with different strength and frequency of vibration, which can be varied in the course of fishing without structural changes and adjustments of the lures.

When leading (posting) the vibrating lure, all its parts actively perform oscillations providing its attractiveness without making a predator trouble.

While opening and closing thick and fast virtually all the design elements of the lure, the vibrating plate makes it impossible for a predator to see it, and the plate itself creates sharp color flashing, which attracts predators.

At turning with great frequency, the plate hits into the design elements that limit turns and, without additional structural elements, creates noise, being attractive for the predators.

Similar to the wobbler, the vibrating lure has the ability to perform deepening, regardless of its weight, and while moving, it is independently deepening by the depth, which is constructively specified and moves without breaking surface at a given depth and even at a considerable speed. The function of deepening can be interrupted and restarted in the course of leading of the vibrating lure.

The vibrating lure designed to operate at great depths is lightweight, which fact makes it convenient for using in various methods of fishing, primarily for trolling, plumb baiting and uniform bottom leading at great depths.

The vibrating lure is efficient in the course of slowest leading, wherein it creates steady vibrations at drawing its nose portion along the bottom.

The vibrating lure starts operating immediately in the beginning of the movement. Moreover, its tail portion, which is equipped with a hook, moves in an elevated state relative to the nose position, reducing the risk of snagging over the hook at the bottom with the obstacles and providing oscillations generated by the vibrating lure.

The vibrating lure has got a simple design, minimum of component parts; the lure manufacture requires no complex technological equipment, expensive materials, and minimum of process steps. Manufacturing the lures of different sizes does not require retrofitting of equipment.

The invention is illustrated by drawings.

Figure 6:
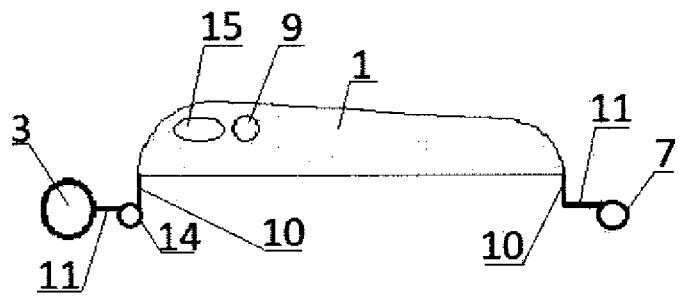
Figure 7:
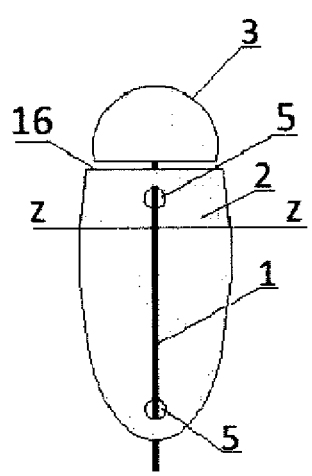
Figure 8:
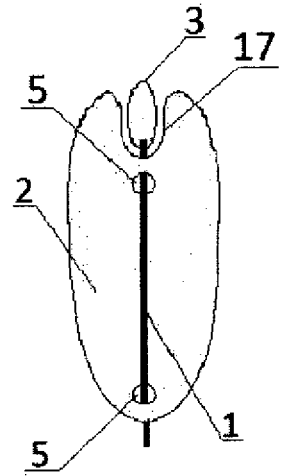
Figure 9:
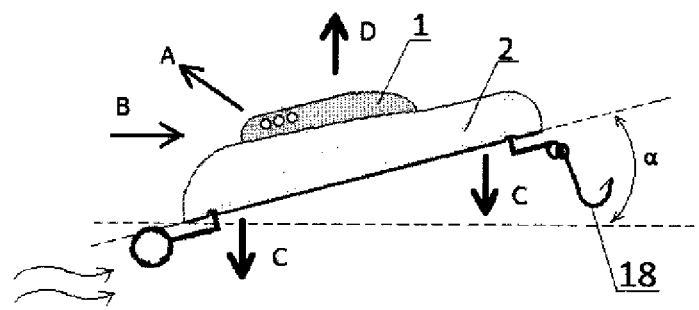
Figure 10:
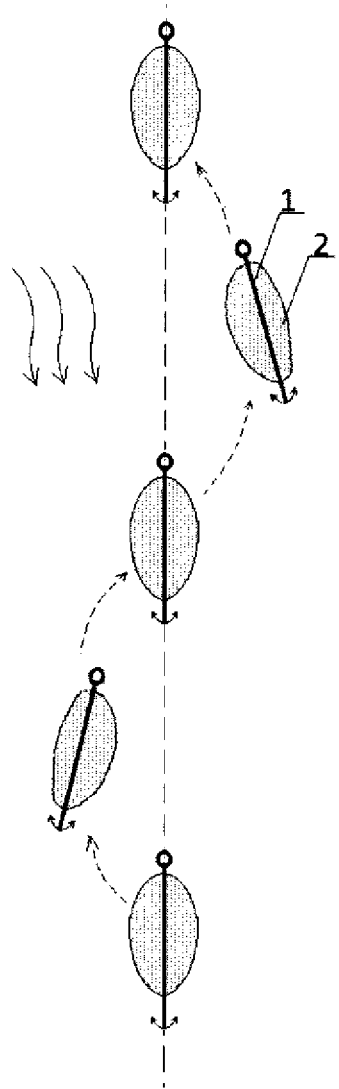

FIG. 6 shows the holder of the second variant of the vibrating lure with the flat middle portion, the oval hole for fixing the fishing line, with the protrusions in the form of shafts, with the protrusion ends diverged apart and with the loop for the additional hook, which loop is formed on the bent forward end of the front protrusion of the holder FIG. 7 shows the vibrating lure with the plate having a flat nose edge, the top view;

FIG. 8 shows vibrating lure with the plate having symmetrical cutout of the nose edge;

FIG. 9 and FIG. 10 show the vibrating lure being operated.

The vibrating lure comprises elongated holder 1 that corresponds to the length of the lure. To the holder, there is movably attached longitudinally elongated plate 2 and load 3.

Figure 1:
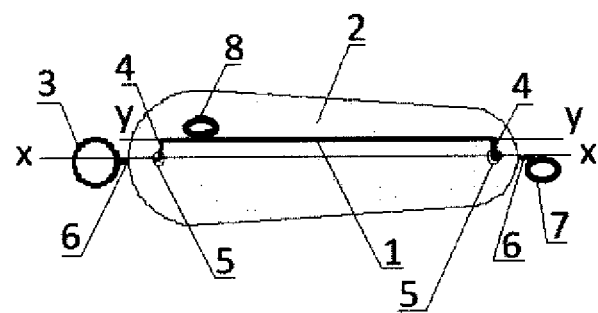
FIG. 1 shows the first variant of the vibrating lure.

According to variant 1 (FIG. 1), the holder is performed as a convex curved metal axle (shaft), which front and rear portions 4 are bent downwards in the vertical plane and are threaded with a gap into two holes 5 of longitudinally elongated plate 2. Holes 5 are performed in the front and rear portions of plate 2 on its longitudinal axis X-X that is also its axis of symmetry. Ends 6 of bent portions 4 of holder 1 are diverged apart. Load 3 is attached at turned ahead end 6 of front bent portion 4 of holder 1. Holder 1 at the rear portion has the hook attached to the holder with the help of loop 7 (FIG. 1) for the hook attachment. The loop is performed at turned back end 6 of rear and bent portion 4 of holder 1. In holder 1, there is performed at least one hole or loop 8 for attaching the fishing line. This hole or loop is performed on top of holder 1 in the vertical plane, and it is arranged above longitudinal axis X-X of plate 2 over the area between the nose and middle portions of plate 2; and wherein that hole or loop is offset rearwards relative to the center of gravity of the lure. Plate 2 being arranged with its longitudinal axis X-X lengthwise to holder 1 is performed either flat or its lateral portions are symmetrically convex curved upwards relative to the longitudinal axis X-X of plate 2, wherein plate 2 being performed with the possibility of rotation around its longitudinal axis X-X in both directions and with the possibility of approach of the raised lateral portions of plate 2, which is maximum turned to each side, at the same distance relative to the vertical plane passing through axis X-X of rotation of plate 2 and longitudinal axis Y-Y of holder 1 without reaching the mentioned vertical plane by the lateral portions of plate 2.

The lure can be additionally equipped with at least one more another hook movably or fixedly attached to the front portion of the lure, with loop 7 for attaching the front hook can performed at front end 6 of bent portion 4 of holder 1 or on load 3.

Load 3 can be fixedly or movable attached to the front portion of holder 1, or it can be executed removable with the ability to be replaced with the load of other weight.

Figure 2:
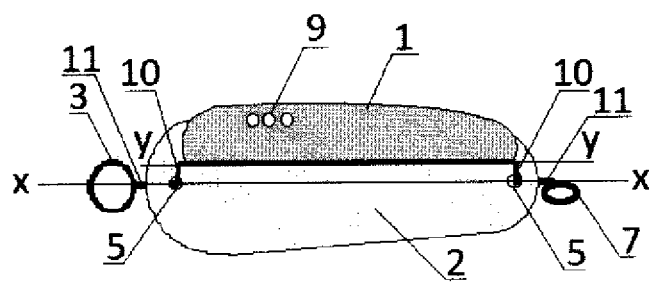
FIG. 2 and FIG. 3 show the second variant of the vibrating lure.
Figure 3:
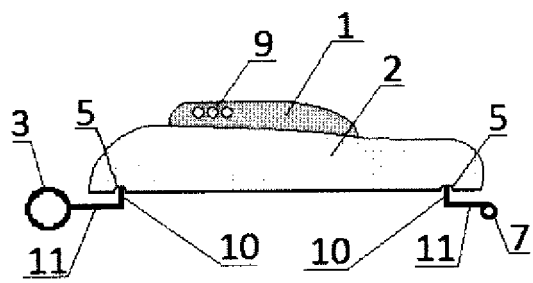
Figure 4:
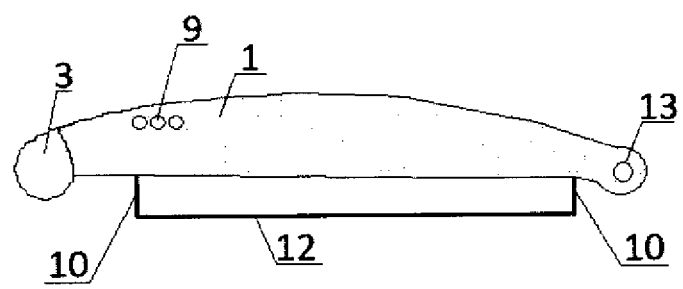
FIG. 4 shows the holder of the second variant of the vibrating lure with consolidated ends of the protrusions of the holder.
Figure 5:
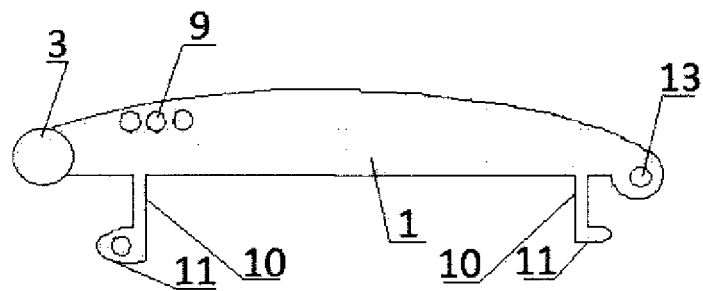
FIG. 5 shows the holder of the second variant of the vibrating lure, this holder being performed flat on its entire length, with the protrusions ends diverged apart, with the protrusions themselves made in the form of flat projecting portions of the holder, and with the load attached to the front, flat and elongated portion of the holder.

According to variant 2 (FIG. 2, FIG. 3), narrow and elongated holder 1 of the streamlined shape being corresponding to the length of the lure, with hole 9 for the fishing line, at least in the middle portion, is performed volumetric and narrow in the cross section or flat in the vertical plane. Holder 1 has protrusions 10 at the front and rear portions. The protrusions are performed transverse to the longitudinal axis Y-Y of the holder, and they are arranged in the same vertical plane with its longitudinal axis. Ends 11 of protrusions 10 can be diverged apart (FIG. 5), consolidated (FIG. 4) or longitudinally expanded. The portions of protrusions 10, which are arranged transverse to longitudinal axis Y-Y of holder 1, are threaded with a gap into two holes 5 of longitudinally elongated plate 2 that are performed in its front and rear portions on longitudinal axis X-X of plate 2 being also the axis of its symmetry. Plate 2 is arranged with its longitudinal axis X-X lengthwise to holder 1. Holes 9 for attaching the fishing line are performed on holder 1, and they are arranged above the longitudinal axis X-X of plate 2 over the area between the nose and middle portions of plate 2; and wherein those holes are offset rearwards relative to the center of gravity of the lure. The lateral portions of plate 2 are symmetrically convex curved upwards relative to the longitudinal axis X-X of plate 2, wherein plate 2 being performed with the possibility of rotation around its longitudinal axis X-X in both directions and with the possibility of approach of the raised lateral portions of plate 2, which is maximum turned to each side, at the same distance relative to the vertical plane passing through the axis of rotation of the plate and the longitudinal axis Y-Y of holder 1 without reaching the mentioned vertical plane by the lateral portions.

The volumetric or flat portion of holder 1 can be made of metal or plastic, and protrusions 10 of the holder may be performed separately as a shaft of wire or in the form of flat projecting portions of the holder.

Except for the hook at the tail portion, the vibrating lure can be additionally equipped with at least one more another hook movably or fixedly attached to the front portion of the lure, with the loops or holes for attaching the both hooks being performed at turned ends 11 of protrusions 10 of holder 1, which protrusions being made in the form of shafts (rods), or with hole 13 for the tail (rear) hook being performed at the flat and rear portion of holder 1, or with loop 14 (FIG. 6) for the front hook being performed on the bent ahead end of front protrusion 11 of holder 1, or on load 3 at the front portion of holder 1.

The front hole for attaching the fishing line may be performed elongated 15 horizontally or obliquely (at an angle) (FIG. 6).

Load 3 can be movably or fixedly connected to the front, elongated and flat portion of holder 1, or to bent forward end 11 of front protrusion 10 of the holder, or it can be performed removable with the possibility of being replaced by the load of other weight, or it may be performed inseparable from holder 1, or formed as an extended or elongated portion of holder 1 being cast of metal.

In the both variants, elongated plate 2 may be executed either with an extended front, middle or rear portion, or with flat nose edge 16 (FIG. 7), or with symmetrical cutout 17 in the nose edge (FIG. 8).

Bent plate 2 may have a curve of cylindrical, conical configuration, in the form of facets or of combined form. Plate 2 may have a flat or flattened front portion and a rear portion curved to a greater extent.

The holes of plate 2 may be performed in the tapered or longitudinal recesses, which are additionally provided on plate 2 and protruded above the surface of its back side, or at least one of the holes of plate 2 may be symmetrically elongated transversely to the plate axis X-X of symmetry.

Load 3 may be arranged at the level of plate 2 or slightly above or below that level. Load 3 can be performed protruding ahead of plate 2, or it at least partially can be situated in a recess of the nose portion of the plate with a gap providing the mobility of the plate, or the rear portion of the elongated load can be positioned over the surface of plate 2.

Load 3 can be made with special sharpening or having roundness at its bottom and front portion, or it has at least one downwardly projecting elastic barb, or a hard barb directed forward or backward.

Hook 18 can be fitted with a fur or synthetic brush, or a silicone worm as the additional attractions for the predators (not shown).

The vibrating lure operates as follows.

At casting, the vibrating lure is so oriented in space during the flight that load 3, which is arranged in the nose portion, is pointed forward, and plate 2 that is located behind load 3 and attached to longitudinal holder 1 not in two points, not in one, flies longitudinally without creating any angle relative to a direction of the countercurrent flow of air and hereby stabilizing the flight. Thus, while flying, the vibrating lure has no flat portions inclined or fluttering planes that prevent or destabilize the flight and also worsen its range. Using tail hook 18 with a brush, or holder 1 with a flat cross section, or volumetric holder of a streamlined form additionally stabilizes the flight of the vibrating lure under windy weather conditions. Therefore, the construction provides good flight characteristics of the vibrating lure and allows an operator to perform sharp casting. Throwing the vibrating lure can be harsh and flatter and does not require any additional skills and manipulations. When being in flight, the fishing line occurs above plate 2 and is arranged along over it, and hook 18 is arranged under plate 2, below the fishing line. Such an arrangement of hook 18 reduces the risk of knotting the line at throwing and excludes knotting the fishing line over hook 18 of the vibrating lure at its vertical deepening in the course of plumb baiting.

The lure position in the flow of water and impact of the forces onto the lure during the motion are illustrated in FIG. 9.

Since the vibrating lure has got hole 9 or loop 8 for attaching the fishing line above the surface of plate 2 at the area between the front edge and the middle portion of the plate, and this point is offset rearwards from the center of gravity of the lure, the vibrating lure, when it hangs on the line in the motionless state, is lowered down, with the nose portion being directed downward.

At starting the movement, the front edge of plate 2 is recessed down, and its rear edge is raised. At the moment of beginning the movement, plate 2 is turning to the oncoming flow of water with its nose portion being deepened. In the course of the movement, the longitudinal axis X-X of plate 2 is located at angle α to the direction of the flow of water, which angle is usually less than the angle, at which the lure is suspended in a stationary state, and the transverse axis Z-Z is perpendicular to the direction of the flow of water, wherein plate 2 is turned to the flow of water with its flat surface or with a surface having the lateral portions being convex curved upward, and it is supported by the bent ends of the protrusions of holder 1.

At the moment of beginning the movement, the impulsive force A, being transmitted from the fishing line to the vibrating lure and directed obliquely, but not horizontally, upward and toward the fisher, is applied to the point of the attachment for the fishing line being arranged above the surface of plate 2 so that the square of plate 2 before this point is less the square behind this point. At the beginning of the vibrating lure motion, the oncoming flow of water affects the plane of plate 2, which plane is downward inclined, resulting in occurrence of force C at the front and rear portions of the vibrating lure in addition to the force of gravity of load 3, wherein the force C being directed downward.

Since in the course of the vibrating lure motion the ratio of lure plate 2 portions before and behind the point for the fishing line attachment does not change, the ratio of the components of the force C directed downward in the nose and tail portions of the vibrating lure remains constant at any speed, therefore, the angle α, under which the moving lure is inclined downward relative to the direction of the flow of water, provides effective deepening of the lure while changing the speed of movement.

At increasing the speed due to the existence of the force of resistance for the vibrating lure and fishing line in the water, there is greatly increased the buoyancy force D, but at the same time there are proportionally increased the components of the deepening force applied to plate 2 in its front and rear portions. Accordingly, even at a significant increase of the speed of the vibrating lure motion, it surfaces continuing to move in the specified horizon. This function of deepening is effective not so much as a result of the weight of load 3, but first of all, due to the effect of deepening provided by plate 2.

Thus, the entire surface of plate 2, the dimensions of which are close to the size of the entire vibrating lure, performs the function of the anti-wing, providing effective deepening of the vibrating lure during its movement. This property is crucial to use the vibrating lure at deep water trolling that is performed at high speed fishing boat.

Since the transverse axis Z-Z vibrating spinners in its middle intermediate position perpendicular to the oncoming flow of water in the motion of a vibrating force spinners turbulence arising from the contact plane of the plate with a running stream of water, make a plate in a state of unstable equilibrium, turn to one side around its longitudinal axis X-X. Since the plate 2 is located in the water flow from the longitudinal axis at an angle α relative to the water flow in the vertical plane at an inclination to the side plate 2 is rotated around its longitudinal axis X-X of the surface plate 2 continues downwards at an angle, allowing the penetration of the vibrating spinners, and the transverse axis Z-Z of the plate 2 (FIG. 7) of the flow front positions in the horizontal plane into the position at an angle to the flow in a horizontal plane.

Since transverse axis Z-Z of the vibrating lure in its middle and intermediate position is perpendicular to the oncoming flow of water, in the course of the vibrating lure motion, the turbulence forces, which arise from occurring the contact of the plate plane with the oncoming flow of water, make the plate being in a state of unstable equilibrium rotate to one of the sides round its longitudinal axis X-X. Since plate 2 is arranged in the flow of water with its longitudinal axis being at angle α relative to the flow of water in the vertical plane, when tilting plate 2 aside with rotating around longitudinal axis X-X, a portion of plate 2 surface continues to occupy the position downwards at an angle, providing for deepening of the vibrating lure, and transverse axis Z-Z of plate 2 (FIG. 7) moves from the front positions relative to the flow in the horizontal plane into the position arranged at an angle to the flow in the horizontal plane. Thus, the force of the flow of water applied to the plane of turned plate 2 creates the lateral biasing force that makes the vibrating lure deviate in the direction opposite to that whereto there is turned the upper surface of plate 2. While operating vibrating lure, plate 2 rotates from side to side about its longitudinal axis X-X with sufficient frequency, being stable, uniform, and rhythmic. Since plate 2 has dimensions substantially corresponding to the size of the entire vibrating lure, the turns of plate 2 result in creating perturbation of large volumes of water, so when moving, the vibrating lure generates strong vibrations in the water of relatively low frequency, which are distributed over long distances. Plate 2 starts vibrating immediately after beginning of the movement, while the character of the vibrations varies depending on the angle, at which longitudinal axis X-X of plate 2 is positioned relative to the oncoming flow of water in the course of movement. The vibrations of plate 2 also occur in the case of uniform and horizontal motion or the motion at a slight angle downward, as well as in the case of its upward movement at any angle. The oscillations of the vibrating lure, which gently descends to the bottom, arise when working at a large angle of the nose portion inclination.

Since plate 2 is arranged substantially along the entire length of the vibrating lure, the lateral biasing force is simultaneously applied to both its front and rear portions, thereby vibrating lure shifts without wobbling from side to side, likewise a wobbler, but it laterally shifts to both sides simultaneously with the whole body, which fact provides creating strong and sharp oscillations that are distributed over long distances. Since in the nose portion of the vibrating lure, there is located load 3, the deviation of its rear portion occurs at a greater distance from the axis of motion, in comparison with its front portion. FIG. 10 shows the trajectory of the vibrating lure motion in the process of leading (top view), and also the position of the vibrating lure at certain moments of its movement.

When using the vibrating lures with light load 3, the nose portion is deflected with almost the same amplitude as the rear portion does. Thus, the longitudinal axis of the vibrating lure with light load 3, while being deflected sideways, deviates from the direction of its movement at a smaller angle. Such deviations of the vibrating lure put in motion all its elements, including load 3, holder 1 and hooks 18, wherein tail hook 18, even equipped with a fur brush or silicone worm, wobbles from side to side further attracting predators by its movement and vibration.

As in the course of the motion, plate 2 is rotating at high speed in each direction either by its convex or concave surface, and also with opening and covering holder 1, while moving, the vibrating lure being constantly overlapped by plate 2 is flashing, and a predator can not even see it in clear water at the surface.

The colored spots of different colors on the upper and lower surfaces, and the shiny patches on the upper surface, and also holder 1 of contrasting colors well visualize the lure in water and attract fish by fast flashing, which reminds a moving fish. At moving, rotatable plate 2 hits about the protrusions of holder 1, uttering a loud knocks, there are also knocks of the hooks being movably attached to the vibrating lure. Because of the fact that fish is sound-sensitive, such a noise additionally attracts predators.

When performing holder 1 made of wire shaft, the deviation of the vibrating lure sideways from its axis of motion is greater than in the case when holder 1 is made volumetric or as a narrow plate.

The narrow and elongated holder 1 of streamlined form having a narrow cross-section of a small square, or wherein the flat holder performs an additional function of a stabilizer improving the flight characteristics of the vibrating lure under windy conditions and also increases the strength of plate 2 vibration. The vibrating lure without a volumetric or flat holder effectively works both with a flat and curved plate, but a degree of bending in such an embodiment of the plate should be small, even substantially smaller than in the lures with flat holder 1. With a significant increase in the degree of curve for plate 2, the vibrating lure, especially its tail (rear) portion, in the course of motion, more deviates from the axis of motion than in the case with small degree of curving or at using flat plate 2 Thus on achieving a certain speed, at one of its end positions, plate 2 occurs with its lower convex surface turned towards the oncoming flow of water, interrupts oscillating, and remains clamped in this position, and gets stuck up to the moment of a corresponding decrease in speed, then it again begins oscillating. At the moment getting stuck, there is no any effect of deepening, and the vibrating lure immediately surfaces up above the level of depth whereat it had been working before getting stuck.

This special feature of operation of the vibrating lure equipped with holder 1 made of wire allows to perform the lure design that is characterized by the intermittent effect of deepening. Controlling the effect of deepening is useful at leading the vibrating lure directly along the bottom with uneven relief, pits and dump, in the moments when the rectilinearly moving vibrating lure reaches the portion with the rising level of the bottom and begins running across the front of the obstacles arisen. In this case, a fisher pulls the fishing rod and accelerates the movement of the vibrating lure, and it rises up bypassing the obstacles. Having stopped pulling, the vibrating lure continues operating under normal conditions in a higher layer of water. This feature is also used when applying a vibrating lure equipped with a light load in shallow water, when the lure is led at the lowest possible speed, and when, after touching the bottom, the lure is lifted into an upper layer of water by pulling. In practice, it is advisable to choose such a degree of plate 2 curve, whereat the vibrating lure moves with an effect of deepening at a speed corresponding to the desired extremely high operating speed of leading. When this speed is exceeded, for example, at sharp pulling, the deepening effect disappears, and the vibrating lure, having slightly risen above the bottom, continues operating at renewal of leading.

When equipped with a volumetric or flat holder 1 the deviations of the vibrating lure from its axis of motion are reduced, but the strength of the oscillations significantly increases, and plate 2 begins creating more aggressive and sharp oscillations, in comparison with the wire holder 1. The amplitude of the vibrating lure deviation from the direction of its motion, in this case, also provides swinging of hooks 18 and load 3, forming a natural appearance of the vibrating lure at moving. In this arrangement, plate 2 can have a much greater degree of curve than design with wire holder 1, as in the course of motion, the vibrating lure with volumetric or flat holder 1 is deviated sideways with a smaller amplitude than the vibrating lure with wire holder 1. When using the volumetric holder, it should have a narrow, that is, small relative to the cross-sectional width of the plate, which is selected so that, during the motion of the lure in water, the volumetric portion of the holder does not interfere with the free flow of water over the plate surface in the course of the horizontal movement, and also when the lure moves in the vertical plane.

Moreover, the holder should have a small height, and it should not have any excessive resistance when being deviated sideways. In practice, the good results have been shown by the holders of the height equal to about a half of the width of the plate in its widest portion.

At vertical baiting as well as at plumb baiting while fishing, there can be used the same vibrating lure that is applied for fishing in leading or trolling, wherein the fishing line is attached to the front hole for attaching the fishing line, which hole is the closest one to the center of gravity of the vibrating lure, so that the vibrating lure, being in the freely suspended position, had a small angle of inclination, as in such a position the vibrating lure has a minimal drag (frontal resistance). In the initial position, the vibrating lure is located on the bottom directly below the fisher or at some distance from the same because of its drift due to the current or the drift of the boat. When pulling on the fishing line, the lifting force is attached to the vibrating lure either vertically upward, or, in the presence of current, at a certain angle.

After pulling on the fishing line, the nose portion of the vibrating lure raises relative to its tail portion under the influence of the motion resistance force applied to plate 2. Plate 2 in the course of the lure operation is based with its rear surface on the bent ends of the protrusions of holder 1. Thus, plate 2 is located at an obtuse angle to the direction of movement, preventing displacement in the vertical plane and providing the movement at en angle.

Accordingly, at pulling on the fishing line upwards, the vibrating lure does not rise vertically upwards, but it gently and at an angle moves in the direction, towards which there is directed load 3 at pulling. At that moment, plate 2 is rhythmically and uniformly rotating from side to side, thereby, the vibrating lure does not move vertically at the vertical baiting, but when lifting, it also performs movement along the bottom, in the course of which it generates oscillations.

Having terminated pulling, the vibrating lure turns and moves to the starting point, with its nose portion again lowering, and the vibrating lure moves at the angle, at which it was at the state of rest before pulling, thus moving in the opposite direction, and plate 2 performs soft vibrations continuing to attract a predator. If driftage fishing is performed from a drifting boat, at pulling, the vibrating lure moves in the direction of the boat motion, and having stopped pulling, the lure, while oscillating, is gradually sinking to the bottom with maintaining its attractiveness for a predator. In such a way, the vibrating lure operates in reservoirs with significant current of water.

The claimed vibrating lure can be used in winter as in ice-free basin, so in the open water for fishing in the wells. At plumb baiting from a drifting boat or in the basins with fast current of water, it is necessary to use the vibrating lures with weighted load 3.

Load 3 in this vibrating lure is necessary not so much for maintaining its motion at a specified depth, like in spinners, as for casting, increasing the speed of its deepening to the bottom immediately after casting and also for providing the correct orientation of plate 2 in the space while leading. Therefore, the vibrating lure having the same plate 2 can be equipped with load 3 of a large range of weight. At the same time, the weighted load 3 is essential for preventing excessive driftage of the vibrating lure with the flow of water when using it in plumb baiting. Applying load 3, pointed in the front lowering portion suitable for those vibrating lures, which are mainly used for trolling, because while being in contact with a bottom, such load 3 would be studded with the bottom, making the tail portion of the vibrating spinners climb up, and causing it to break away from the bottom.

Thus, the vibrating lure, when occurring on falling on shallow areas, overcomes them without continuous drawing load 3 on the bottom.

Since in the process of operation the vibrating lure generates oscillations at a very low speed of motion, and while moving at its operative position it is tilted with its nose portion down, leading can be performed in such a way that the nose portion with load 3 moved sliding right along the bottom, and the rest of the portions of the vibrating lure, which are located in an elevated position, generated oscillation of full value.

The usage of loads 3 with rounded front portions, as well as applying thereon the fixed and downward directed elastic and rigid barbs, which can be bent rearwards, makes it possible, at uniform leading, to lead the vibrating lure at the bottom so that, in the process of slow leading, load 3 would be constantly in contact with the bottom, sliding on it without any hard poking and bumps that scare fish, and while being bent forward, a hard barb would be in contact with the bottom and additionally signal about the contact with the bottom, which is advisable when using a bleshnya when fishing by a method of trolling.

Using several points for the fishing line attachment performed with different shifts relative to the center of gravity of the vibrating lure allows changing the character of its oscillations in the course of its operation. Attaching of the fishing line to the holder through the front hole being approximate to the center of gravity of the vibrating lure can create small and soft vibrations.

With increasing the distance of the fishing line attachment point rearwards from the center of gravity of the vibrating lure, there is increased the angle at which the vibrating lure is arranged in the flow of water, and respectively, there is increased the strength and sharpness of its oscillations in the course of the motion, and also there is increased its drag.

Thus, in practice, the best deepening effect has been exposed by the lure at the value of angle α within the range of 20 to 30 degrees. Also, at such an angle α, the moving and vibrating lure has a slight drag, respectively, without causing significant forces making the lure floating to the surface.

The strength and sharpness of the vibrating lure vibration increase with increasing the value of angle α, at the same time, there is reduced the deepening effect of such lures. In addition, the vibrating lure gradually puts down to the bottom after having stopped leading and exposes the better organized oscillations with increasing the values of angle α. Accordingly, fixing the fishing line into the holes arranged far from the center of gravity of the lure is advisable to use when at cast fishing with low speed of the lure at leading, evenly or step by step, with pulling on the lure and subsequent deepening onto the bottom, or at leading the lure at the lowest speed with sliding the load of the lure on the bottom of a basin.

To use the vibrating lure at plumb baiting, hole 9 or loop 8 for attaching the fishing line, being the closest to the center of gravity, can be performed horizontally elongated. In such a case, because of the resistance to the movement exerted by plate 2, at pulling on the fishing line, the fastener of the fishing line moves forward, which helps to improve the horizontal component of the vibrating lure moving upward. When stopping the movement after turning, its weighted nose portion moves forward and down, the vibrating lure angle increases, and the lure starts oscillating more intensively when returning to the initial point. Likewise, the vibrating lure with elongated hole 15 or the loop can be used when leading at the bottom with periodic stops or steps. For the vibrating lure, which is mainly intended for such a use, it is advisable to apply hole 9 for attaching the fishing line as the most distant one from the center of gravity of the vibrating lure.

The degree and form of the curve influence on the nature of the oscillations. So, flat or slightly curved plate 2 creates softer vibrations of greater frequency than a much curved plate. Using the faceted forms of the curve or the curve with a middle longitudinal portion having the flattened lateral edges provides generating of more sharp oscillations, respectively, using the plates with softly curved lateral edges provides a soft play of the lure. The completely flat plates should be only used in the design of the vibrating lure with a holder made of wire. The vibrating lures with volumetric or flat holder 1 are worse run with completely flat plate 2, requiring the achievement of a specified speed, while plate 2, even with a minimal curve upwards, start working from the moment of the beginning of the movement.

A greater degree of plate 2 curve causes reducing of the oscillation frequency and increasing the amplitude of the oscillation, preferably at fishing of the certain types of predator. However, for the preferential use by trolling or plumb baiting, it is expedient to apply the vibrating lures with moderately curved plates 2. It is possible to use a combined curve with a flat or flattened front portion and a curved rear portion of plate 2.

Using plates 2 with one or both horizontally elongated holes 5 allows the vibrating lure to perform the additional vibrations during operation. Using the vibrating lure having the additional tapered or elongated convex curves at the places of executing the holes allows placing away the axis of rotation of plate 2 from its rear surface to create more intense vibrations and increase the angle of rotation around the axis of the plate.

Using plate 2 with the extended front portion is preferably intended for the vibrating lures designed for trolling and plumb baiting. Performing the nose edge straight portion allows plate 2 closely come nearer load 3 at the nose portion, mimicking the silhouette of fish, and the use of the nose edge with a cut allows to place the main portion of load 3 within the general dimensions of plate 2, while the vibrating plate 2 visually hides the presence of load 3.

Fitting the hook with a fur or synthetic brush or silicone worm to organize the additional attraction for a predator increases their resistance to the movement with reducing the angle of the longitudinal axis X-X of vibrating plate 2 for the moving vibrating lure relative to the flow of water, which requires increasing the angle of the nose portion at the stationary state.

In the process of leading the vibrating lure, these elements are oscillating from side to side without hindering the generation of the vibrations.

Furthermore, the use of these elements reduces the amplitude of the lure oscillations in the flow of water, which allows increasing the degree of convex curving the plate in the case of the obligatory reducing the frequency of the lure vibrations.

The invention claimed is:

1. A vibrating lure, comprising:
   an elongated holder running through an entire length of the vibrating lure, the elongated holder having a front portion, a rear portion, a top portion, a bottom portion, a first protrusion located at the front portion of the holder, the first protrusion is formed as a bend of the front portion of the holder and includes a rectilinear portion directed downwards towards the bottom portion in a vertical plane of the elongated holder, the rectilinear portion has a lower area with a longitudinal portion directed in a first direction, a second protrusion located at the rear portion of the elongated holder, the second protrusion is a bend of the rear portion of the holder and includes a rectilinear portion directed downwards towards the bottom portion and located in the vertical plane of the elongated holder, the rectilinear portion of the second protrusion has a lower area with a longitudinal portion directed in a second direction, the first direction is opposite to the second direction:

a load located at the front portion of said elongated holder;

a loop to attach a hook is located at the rear portion of said elongated holder;

an elongated plate is rotatably attached to the elongated holder, the elongated holder runs through the entire longitudinal axis of the elongated plate, the elongated plate includes a front end, a middle section, a rear section, a first hole, and a second hole, the first and the second holes are located on the longitudinal axis of the elongated plate, the rectilinear portion of the first protrusion is threaded with a gap into the first hole of the elongated plate and the rectilinear portion of the second protrusion is threaded with a gap into the second hole of the plate;

the elongated holder is a curved metal shaft;

at least one fishing line loop located at the top portion of the holder and above an area of the elongated plate between the front end and the middle section of the elongated plate and is placed above a longitudinal axis of the elongated plate, each fishing line loop is offset rearwards relative to a center of gravity of the vibrating lure;

the elongated plate is arranged with its longitudinal axis lengthwise to the elongated holder, the elongated plate includes lateral portions symmetrically curved upwardly relative to the longitudinal axis of the plate.

2. The vibrating lure as claimed in claim 1, wherein:
the fishing line loop is a wire loop or a metal eyelet; and is formed horizontally elongated or at an angle with regards to the elongated holder.

3. The vibrating lure as claimed in claim 1, wherein the elongated plate is formed either with an extended front, middle or rear portion, or with a flat nose edge, or with a symmetrical cutout in the nose edge.

4. The vibrating lure as claimed in claim 1, wherein the elongated plate has a curve of cylindrical.

5. The vibrating lure as claimed in claim 1, wherein the load is fixed or movably attached to the front portion of the holder, or is removably and replaceably attached with the load or other weight.

6. The vibrating lure as claimed in claim 1, wherein the load is arranged at a level of a horizontal plane containing said longitudinal axis of the plate or slightly above or below that said level, and is formed protruding ahead of the plate, or is situated at least partially in a recess of the nose portion of the plate with a gap providing for mobility of the plate, or a rear portion of the load is positioned over a portion of the plate.

7. A vibrating lure, comprising:
a narrow and elongated holder running through an entire length of the vibrating lure, the elongated holder having a front portion, a rear portion, a top portion, a bottom portion, a first protrusion located at the front portion of the holder, the first protrusion includes a rectilinear portion directed downwards towards the bottom portion in a vertical plane of the elongated holder, the rectilinear portion has a lower area with a longitudinal portion directed in a first direction, a second protrusion located at the rear portion of the elongated holder, the second protrusion includes a rectilinear portion directed downwards towards the bottom portion and located in the vertical plane of the elongated holder, the rectilinear portion of the second protrusion has a lower area with a longitudinal portion directed in a second direction, the first direction is opposite to the second direction, the first protrusion and the second protrusion are motionless with regards to the elongated holder;

a load located at the front portion of the elongated holder;

a loop to attach a hoof located at the rear portion of said elongated holder;

an elongated plate is rotatably attached to the elongated holder, the elongated holder runs through the entire longitudinal axis of the elongated plate, the elongated plate includes a front end, a middle section, a rear section, a first hole, and a second hole, the first and second holes are located on the longitudinal axis of the elongated plate, the rectilinear portion of the first protrusion is threaded with a gap into the first hole of the elongated plate and the rectilinear portion of the second protrusion is threaded with a gap into the second hole of the plate;

said elongated holder is volumetric and narrow in cross section or flat in a vertical plane, at least one fishing line loop located at the top portion of the holder, above an area of the elongated plate between the front end and middle section of the elongated plate and is placed above a longitudinal axis of the elongated plate, each fishing line loop is offset rearwards relative to a center of gravity of the vibrating lure;

the elongated plate is arranged with its longitudinal axis lengthwise to the elongated holder, the elongated plate includes lateral portions symmetrically curved upwardly relative to the longitudinal axis of the plate.

8. The vibrating lure as claimed in claim 7, wherein:
the volumetric or flat portion of the holder is made of metal or plastic.

9. The vibrating lure as claimed in claim 7, wherein the elongated holder includes one, two, or three fishing line loops that are formed as wire loops or metal eyelets, each one of the fishing line loops is located above the elongated plate and one of the fishing line loops is located in the front portion of the elongated holder and is formed elongated horizontally or at an angle with regards to the elongated holder.

10. The vibrating lure as claimed in claim 7, wherein the plate is formed either with an extended front, middle or rear portion, or with a flat nose edge, or with a symmetrical cutout in the nose edge.

11. The vibrating lure as claimed in claim 7, wherein:
the elongated plate has a curve of cylindrical.

12. The vibrating lure as claimed in claim 7, wherein the load is movably or fixedly connected to a front, elongated or flat portion of the holder, or the bottom portion and is directed in the first direction of the first protrusion of the holder, or is formed removable as an extended forward or outstretched portion of the holder being cast of metal.

13. The vibrating lure as claimed in claim 7, wherein the load is arranged at a level of a horizontal plane containing said longitudinal axis of the plate or slightly above or below said level, and it is formed protruding ahead of the plate, or is situated at least partially in a recess of the nose portion of the plate with a gap providing for mobility of the plate, or a rear portion of the load is positioned over a portion of the plate.

* * * * *